US006891648B2

(12) United States Patent
Inoue et al.

(10) Patent No.: US 6,891,648 B2
(45) Date of Patent: May 10, 2005

(54) IMAGE-READING DEVICE PERFORMING A WHITE-SHADING CORRECTION BY OBTAINING A PEAK VALUE OF AVERAGE VALUES OF IMAGE DATA AND READ FROM A REFERENCE-WHITE MEMBER IN BLOCKS AS WHITE-SHADING DATA

(75) Inventors: Yoshikazu Inoue, Kanagawa (JP); Wataru Nara, Kanagawa (JP); Yasuyuki Nomizu, Kanagawa (JP); Hiroyuki Kawamoto, Kanagawa (JP); Hiroshi Fukano, Chiba (JP); Motoya Sano, Tokyo (JP); Hiroshi Kubo, Saitama (JP); Hitoshi Hattori, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 535 days.

(21) Appl. No.: 09/940,589

(22) Filed: Aug. 29, 2001

(65) Prior Publication Data

US 2002/0054374 A1 May 9, 2002

(30) Foreign Application Priority Data

Sep. 1, 2000 (JP) .................................... 2000-266106
Mar. 16, 2001 (JP) .................................... 2001-075636

(51) Int. Cl.$^7$ ............................................. G06K 15/07
(52) U.S. Cl. ........................ 358/516; 358/461; 382/274
(58) Field of Search ............................. 358/461, 516; 382/274; 399/279, 280

(56) References Cited

U.S. PATENT DOCUMENTS

| 4,760,464 A | | 7/1988 | Sakano ..................... 358/461 |
| 4,987,485 A | * | 1/1991 | Hirota ....................... 358/516 |
| 5,062,144 A | * | 10/1991 | Murakami ................. 382/274 |
| 5,107,350 A | * | 4/1992 | Omori ....................... 358/461 |
| 5,371,613 A | * | 12/1994 | Arimoto et al. ........... 358/461 |
| 5,572,337 A | | 11/1996 | Kajitani et al. ........... 358/461 |
| 5,644,409 A | | 7/1997 | Irie et al. .................. 358/461 |
| 6,075,623 A | * | 6/2000 | Yun .......................... 358/486 |
| 6,217,143 B1 | * | 4/2001 | Munakata et al. .......... 347/16 |
| 6,246,484 B1 | * | 6/2001 | Shimamura et al. ...... 358/1.12 |
| 6,295,140 B1 | * | 9/2001 | Kameyama ............... 358/461 |
| 6,456,324 B1 | * | 9/2002 | Yamada et al. .......... 348/219.1 |

FOREIGN PATENT DOCUMENTS

| JP | 01233874 A | * | 9/1989 | ............ H04N/1/04 |
| JP | 11-75062 | | 3/1999 | |

OTHER PUBLICATIONS

U.S. Appl. No. 10/646,754, filed Aug. 25, 2003, Kodama et al.
U.S. Appl. No. 10/797,129, filed Mar. 11, 2004, Nomizu.

* cited by examiner

*Primary Examiner*—Daniel Miriam
*Assistant Examiner*—Dennis Rosario-Vasquez
(74) *Attorney, Agent, or Firm*—Oblon, Spivak, McClelland, Maier & Neustadt, P.C.

(57) ABSTRACT

An image-reading device is provided. The image-reading device comprises a photoelectric converting element reading a first image from a subject copy, a reference-white member functioning as a reference white used in a white-shading correction, reading means for reading a second image from a constant range on a surface of the reference-white member by using the photoelectric converting element, averaging means for dividing image data of the second image into a plurality of blocks in a sub-scanning direction so that each of the blocks includes a plurality of lines and obtaining average values of image data of the lines in the blocks respectively, peak-value determining means for obtaining a peak value of the average values, and white-shading correcting means for performing the white-shading correction to image data of the first image by using the peak value as white-shading data.

12 Claims, 12 Drawing Sheets

IMAGE-READING DEVICE PERFORMING A WHITE-SHADING CORRECTION BY OBTAINING A PEAK VALUE OF AVERAGE VALUES OF IMAGE DATA AND READ FROM A REFERENCE-WHITE MEMBER IN BLOCKS AS WHITE-SHADING DATA

BACKGROUND OF THE INVENTION

1. Field of the Invention

The present invention generally relates to an image-reading device, an image-forming device, and a reference-white data creating method, and more particularly, to an image-reading device, an image-forming device, and a reference-white data creating method which perform a white-shading correction.

2. Description of the Related Art

In an image-reading device of a type having a movable image-reading unit represented by a conventional flat-bed type, white-shading data is created by reading a density of a reference-white plate placed within a range in which a carriage moves to an effective read-range limit at an increasing speed. In an image-reading device of a type having a fixed image-reading unit represented by a sheet-through type, white-shading data is created by reading a density of a reference-white plate or a white roller placed on a surface opposite the fixed image-reading unit.

However, in a conventional technology of creating the white-shading data, the surface of the reference-white plate or the white roller is stained as time elapses so that a reference density varies depending on a read range of the reference-white plate or the white roller; this disables maintaining a uniform density necessary for creating the white-shading data. Especially, in the sheet-through type, since a subject copy is conveyed on the surface of the reference-white plate or the white roller, the reference-white plate or the white roller is remarkably stained while being used.

Thereupon, regarding the image-reading device of the sheet-through type, there is a conventional technology of creating the white-shading data based on white data corresponding to a head margin (containing no image) of a subject copy, or based on data of several pixels located at an end part in a main scanning direction on which a subject copy does not pass (and which is not likely to be stained).

In addition, Japanese Laid-Open Patent Application No. 5-319613 discloses a technology in which a groove is formed at a portion of a circumferential surface of a read roller, and a reference-white portion is provided at a bottom portion of the grove for use in a creation of white-shading data so that the reference-white portion is kept from being stained despite the conveyance of a subject copy.

However, the above-mentioned conventional technology of creating white-shading data based on white data corresponding to a head margin of a subject copy has a problem that there is not always a margin in a subject copy. Also, the above-mentioned conventional technology of creating white-shading data based on data of several pixels located at an end part in a main scanning direction on which a subject copy does not pass has a problem that, when the quality of data of pixels in a main scanning direction varies, white-shading data based on white data of some of these pixels cannot contribute to a sufficient white-shading correction.

In addition, in the above-mentioned technology disclosed in Japanese Laid-Open Patent Application No. 5-319613, dust and waste of paper powders and toners produced as subject copies being conveyed are accumulated in the above-mentioned groove which is not easy to clean up. Additionally, a shadow of the groove is formed by a light projected from a light source of a reader portion so as to deteriorate the quality of the read image.

SUMMARY OF THE INVENTION

It is a general object of the present invention to provide an improved and useful image-reading device, an image-forming device, and a reference-white data creating method in which the above-mentioned problems are eliminated.

A more specific object of the present invention is to provide an image-reading device, an image-forming device, and a reference-white data creating method which can keep a density of white-shading data uniform so as to perform a high-quality image-reading, can prevent a read roller from being stained due to a contact with a subject copy, can make at least one block of image data exclusively include an image of a reference-white read surface, can create white-shading data from the least stained part on the surface of the read roller, can define a plurality of blocks positioned differently in a particular part on the surface of the read roller at each round, can decrease the influence of a small flaw or a small stain possibly existing on the surface of the read roller, so as to keep a density of white-shading data precisely uniform so as to perform a higher-quality image-reading, and can calculate moving average values by shifting the start line of each block of image data by one line so as to improve the precision of selecting image data of an unstained part of a reference-white member, such as the read roller or a reference-white plate, as white-shading data.

In order to achieve the above-mentioned objects, there is provided according to one aspect of the present invention an image-reading device comprising:

a photoelectric converting element reading a first image from a subject copy;

a reference-white member functioning as a reference white used in a white-shading correction;

reading means for reading a second image from a constant range on a surface of the reference-white member by using the photoelectric converting element;

averaging means for dividing image data of the second image into a plurality of blocks in a sub-scanning direction so that each of the blocks includes a plurality of lines, and obtaining average values of image data of the lines in the blocks respectively;

peak-value determining means for obtaining a peak value of the average values; and white-shading correcting means for performing the white-shading correction to image data of the first image by using the peak value as white-shading data.

According to the present invention, the white-shading data can be obtained by selecting image data of an unstained part of a constant read range on the surface of the reference-white member. Therefore, a density of the white-shading data can be kept uniform so as to perform a high-quality image-reading.

In order to achieve the above-mentioned objects, there is also provided according to another aspect of the present invention an image-reading device comprising:

a photoelectric converting element reading a first image from a subject copy;

a scanning optical system scanning the subject copy by exposing the subject copy to light so as to form the first image on the photoelectric converting element;

a reference-white plate functioning as a reference white used in a white-shading correction;

reading means for reading a second image from a constant range on a surface of the reference-white plate by using the photoelectric converting element;

averaging means for dividing image data of the second image into a plurality of blocks in a sub-scanning direction so that each of the blocks includes a plurality of lines, and obtaining average values of image data of the lines in the blocks respectively;

peak-value determining means for obtaining a peak value of the average values; and white-shading correcting means for performing the white-shading correction to image data of the first image by using the peak value as white-shading data.

In the image-reading device of a type having a movable image-reading unit according to the present invention, the white-shading data can be obtained by selecting image data of an unstained part of a constant read range on the surface of the reference-white plate. Therefore, a density of the white-shading data can be kept uniform so as to perform a high-quality image-reading.

In order to achieve the above-mentioned objects, there is also provided according to another aspect of the present invention an image-reading device comprising:

a subject-copy-conveying path conveying a subject copy;

a photoelectric converting element placed on the subject-copy-conveying path so as to read a first image from a surface of the subject copy;

a read roller placed opposite the photoelectric converting element with the subject-copy-conveying path therebetween so as to keep a distance constant between the surface of the subject copy and the photoelectric converting element by revolving, a surface of the read roller functioning as a reference white used in a white-shading correction;

reading means for reading a second image from a constant range on the surface of the read roller by using the photoelectric converting element;

averaging means for dividing image data of the second image into a plurality of blocks in a sub-scanning direction so that each of the blocks includes a plurality of lines, and obtaining average values of image data of the lines in the blocks respectively;

peak-value determining means for obtaining a peak value of the average values; and white-shading correcting means for performing the white-shading correction to image data of the first image by using the peak value as white-shading data.

In the image-reading device of a type having a fixed image-reading unit according to the present invention, the white-shading data can be obtained by selecting image data of an unstained part of a constant read range on the surface of the reference-white read roller. Therefore, a density of the white-shading data can be kept uniform so as to perform a high-quality image-reading.

Additionally, in the image-reading device according to the present invention, the read roller may have a reference-white read surface formed as a part of the surface thereof, the reference-white read surface having a center of curvature on a straight line crossing a central axis of the read roller orthogonally so that the reference-white read surface is formed as a curved surface located inside an outermost peripheral locus of the read roller.

According to the present invention, the reference-white read surface is not likely to contact the subject copy being conveyed. Accordingly, the reference-white read surface is not likely to be stained due to the contact with the subject copy; thus, the reference-white read surface can be kept white for a long period of time without cleaning. Therefore, a density of the white-shading data can be kept uniform precisely so as to perform a higher-quality image-reading.

Additionally, in the image-reading device according to the present invention, the constant range may be at least one round on the surface of the read roller, and a length of each of the blocks in the sub-scanning direction is smaller than a length of the reference-white read surface.

According to the present invention, at least one block of image data can exclusively include the image of the reference-white read surface. Therefore, a density of the white-shading data can be kept uniform precisely so as to perform a high-quality image-reading.

Additionally, in the image-reading device according to the present invention, the constant range may be at least one round on the surface of the read roller.

According to the present invention, the white-shading data can be created from the least stained part on the surface of the read roller. Therefore, a density of the white-shading data can be kept uniform precisely so as to perform a high-quality image-reading.

Additionally, in the image-reading device according to the present invention, the constant range may be a range exceeding one round on the surface of the read roller; and a length of each of the blocks in the sub-scanning direction may be so set that, when the constant range is divided into the blocks, a fractional block is created in each round of the constant range.

According to the present invention, it is possible to calculate average values of a plurality of blocks positioned differently in a particular part on the surface of the read roller at each round. Therefore, a density of the white-shading data can be kept uniform precisely so as to perform a high-quality image-reading.

Additionally, in the image-reading device according to the present invention, the averaging means may obtain average values of image data of at least every second line of the lines in the blocks respectively.

According to the present invention, even when a small flaw or a small stain exists on the surface of the reference-white member, the reference-white plate, or the read roller, the influence thereof can be decreased. Therefore, a density of the white-shading data can be kept uniform precisely so as to perform a high-quality image-reading.

Additionally, in the image-reading device according to the present invention, the averaging means may obtain moving averages of image data of respective sets of lines in the second image, instead of obtaining the average values of the image data of the lines in the blocks respectively; and the peak-value determining means may obtain a peak value of the moving average values.

According to the present invention, the white-shading data can be obtained by selecting image data of an unstained part of a constant read range on the surface of the reference-white member. Therefore, a density of the white-shading data can be kept uniform so as to perform a high-quality image-reading.

Additionally, in the image-reading device according to the present invention, the averaging means may obtain the moving averages by moving first lines of the respective sets of the lines from each other by one line.

According to the present invention, the precision of selecting image data of an unstained part of the reference-white member as white-shading data can be improved, compared to moving first lines of the respective sets from each other by a plurality of lines.

In order to achieve the above-mentioned objects, there is also provided according to another aspect of the present invention an image-forming device comprising:

an image-reading device including:
a photoelectric converting element reading a first image from a subject copy;
a reference-white member functioning as a reference white used in a white-shading correction;
reading means for reading a second image from a constant range on a surface of the reference-white member by using the photoelectric converting element;
averaging means for dividing image data of the second image into a plurality of blocks in a sub-scanning direction so that each of the blocks includes a plurality of lines, and obtaining average values of image data of the lines in the blocks respectively;
peak-value determining means for obtaining a peak value of the average values; and
white-shading correcting means for performing the white-shading correction to image data of the first image by using the peak value as white-shading data,
wherein an image is formed on a sheet according to the image data of the first image.

In the image-forming device according to the present invention, the white-shading data can be obtained by selecting image data of an unstained part of a constant read range on the surface of the reference-white member. Therefore, a density of the white-shading data can be kept uniform so as to perform a high-quality image-reading.

In order to achieve the above-mentioned objects, there is also provided according to another aspect of the present invention a method of creating reference-white data comprising:

the reading step of reading an image from a constant range on a surface of a reference-white member by using a photoelectric converting element, the reference-white member functioning as a reference white used in a white-shading correction;
the averaging step of dividing image data of the image into a plurality of blocks in a sub-scanning direction so that each of the blocks includes a plurality of lines, and obtaining average values of image data of the lines in the blocks respectively; and
the peak-value determining step of obtaining a peak value of the average values so as to create white-shading data.

According to the present invention, the white-shading data can be obtained by selecting image data of an unstained part of a constant read range on the surface of the reference-white member. Therefore, a density of the white-shading data can be kept uniform so as to perform a high-quality image-reading.

Additionally, in the reference-white data creating method according to the present invention, the reading step may read an image from a constant range on a surface of a revolving read roller as the reference-white member, the revolving read roller being placed opposite the photoelectric converting element, and the constant range may be at least one round on the surface of the revolving read roller.

According to the present invention, the white-shading data can be created from the least stained part on the surface of the read roller. Therefore, a density of the white-shading data can be kept uniform precisely so as to perform a high-quality image-reading.

Additionally, in the reference-white data creating method according to the present invention, the reading step may read an image from a constant range on a surface of a revolving read roller as the reference-white member, the revolving read roller being placed opposite the photoelectric converting element, and the constant range being a range exceeding one round on the surface of the revolving read roller; and the averaging step may set a length of each of the blocks in the sub-scanning direction so that, when the constant range is divided into the blocks, a fractional block is created in each round of the constant range.

According to the present invention, it is possible to calculate average values of a plurality of blocks positioned differently in a particular part on the surface of the read roller at each round. Therefore, a density of the white-shading data can be kept uniform precisely so as to perform a high-quality image-reading.

Additionally, in the reference-white data creating method according to the present invention, the reading step may read an image from a constant range on a surface of a revolving read roller as the reference-white member, the revolving read roller being placed opposite the photoelectric converting element and having a reference-white read surface formed as a part of the surface thereof, the reference-white read surface having a center of curvature on a straight line crossing a central axis of the revolving read roller orthogonally so that the reference-white read surface is formed as a curved surface located inside an outermost peripheral locus of the revolving read roller, and the constant range being at least one round on the surface of the revolving read roller; and the averaging step may set a length of each of the blocks in the sub-scanning direction smaller than a length of the reference-white read surface.

According to the present invention, at least one block of image data can exclusively include the image of the reference-white read surface. Therefore, a density of the white-shading data can be kept uniform precisely so as to perform a high-quality image-reading.

Additionally, in the reference-white data creating method according to the present invention, the averaging step may obtain average values of image data of at least every second line of the lines in the blocks respectively.

According to the present invention, even when a flaw or a stain exists on the surface of the reference-white member such as the reference-white plate or the read roller, the influence thereof can be decreased. Therefore, a density of the white-shading data can be kept uniform precisely so as to perform a high-quality image-reading.

Additionally, in the reference-white data creating method according to the present invention, the averaging step may obtain moving averages of image data of respective sets of lines in the image, instead of obtaining the average values of the image data of the lines in the blocks respectively; and the peak-value determining step may obtain a peak value of the moving average values.

According to the present invention, the white-shading data can be obtained by selecting image data of an unstained part of a constant read range on the surface of the reference-white member. Therefore, a density of the white-shading data can be kept uniform so as to perform a high-quality image-reading.

Additionally, in the reference-white data creating method according to the present invention, the averaging step may obtain the moving averages by moving first lines of the respective sets of the lines from each other by one line.

According to the present invention, the precision of selecting image data of an unstained part of the reference-white member as white-shading data can be improved, compared to moving first lines of the respective sets from each other by a plurality of lines.

Other objects, features and advantages of the present invention will become more apparent from the following detailed description when read in conjunction with the accompanying drawings.

DETAILED DESCRIPTION OF THE PREFERRED EMBODIMENTS

[Embodiment 1]

A description will now be given of a first embodiment according to the present invention.

Figure 1:
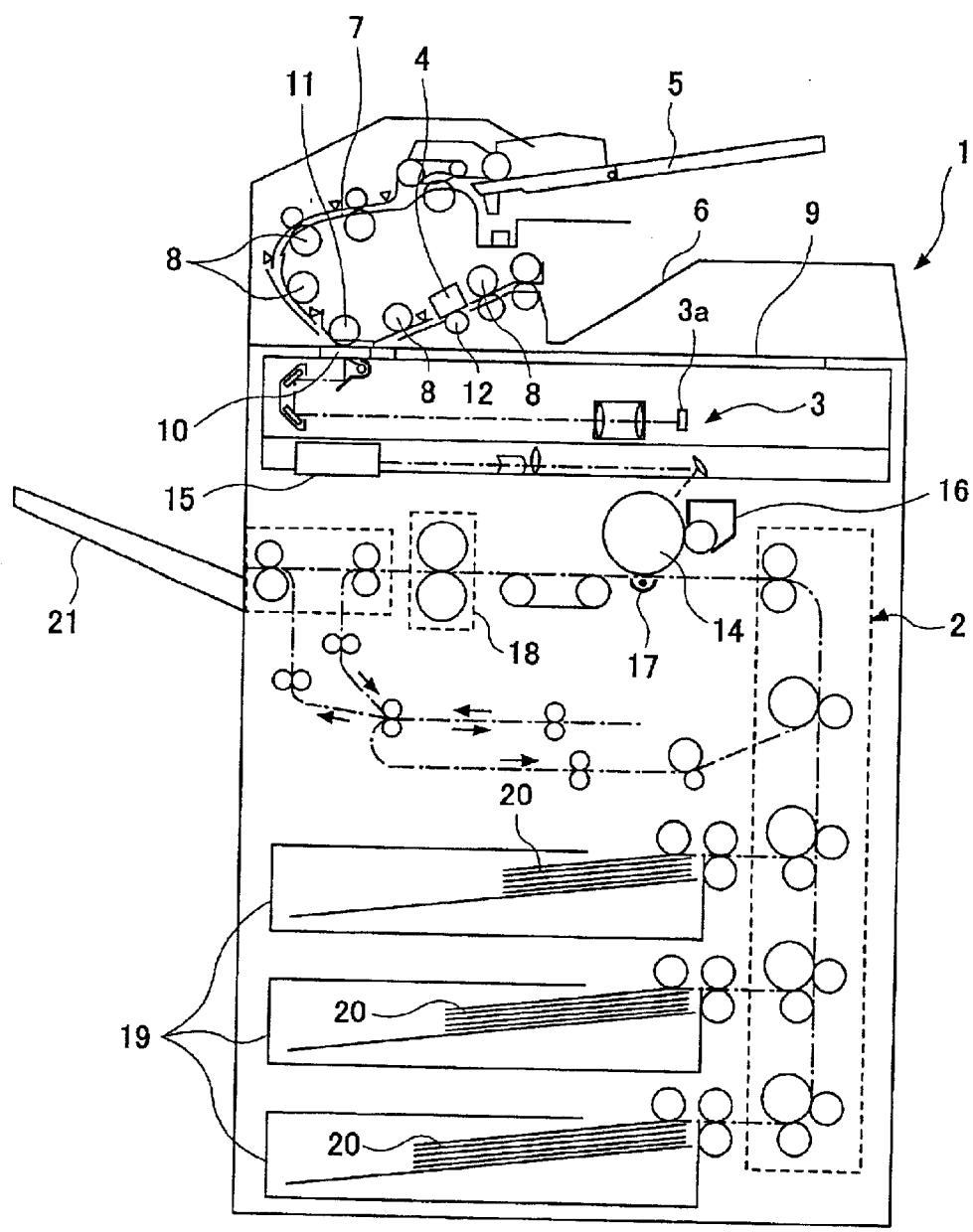
FIG. 1 is a vertical-sectional front view outlining a structure of a copier according to a first embodiment of the present invention.

FIG. 1 is a vertical-sectional (front) view outlining a structure of a copier according to the first embodiment of the present invention. This copier is an embodiment of an image-forming device according to the present invention. As shown in FIG. 1, this copier comprises an image scanner 1, which is an image-reading device, and a printer 2, which forms an image on a sheet by electrophotography according to image data read by the image scanner 1.

As shown in FIG. 1, the image scanner 1 comprises a first image-reading unit 3, a second image-reading unit 4, a subject-copy-setting unit 5, a subject-copy-delivering unit 6, a subject-copy-conveying path 7, a multitude of conveying rollers 8, a first contact glass 9, a second contact glass 10, a first read roller 11, a second read roller (a reference-white member) 12, and other elements.

A subject copy D (see FIG. 3), which is to be read, is set on the subject-copy-setting unit 5. After an image-reading, the subject copy D is delivered to the subject-copy-delivering unit 6. The subject-copy-conveying path 7 is provided between the subject-copy-setting unit 5 and the subject-copy-delivering unit 6. The subject copy D to be read is conveyed one by one via the subject-copy-conveying path 7. Upon reading the subject copy D, the image on one side of the subject copy D is read by the first image-reading unit 3, or the images on both sides of the subject copy D are read by the first image-reading unit 3 and the second image-reading unit 4, according to a selected mode.

The first image-reading unit 3 can read the image of the subject copy D placed fixedly on the first contact glass 9 by using a CCD 3a, and also can read the image (a front-side image) of the subject copy D conveyed between the second contact glass 10 and the first read roller 11 (i.e., on the subject-copy-conveying path 7). Upon reading the subject copy D conveyed on the subject-copy-conveying path 7, the first read roller 11 is revolved at the same speed as the conveying rollers 8 by a stepping motor for use in the revolution (not shown in the figure), and functions in such a manner as to press the subject copy D, which is being conveyed, against the second contact glass 10.

Figure 4:
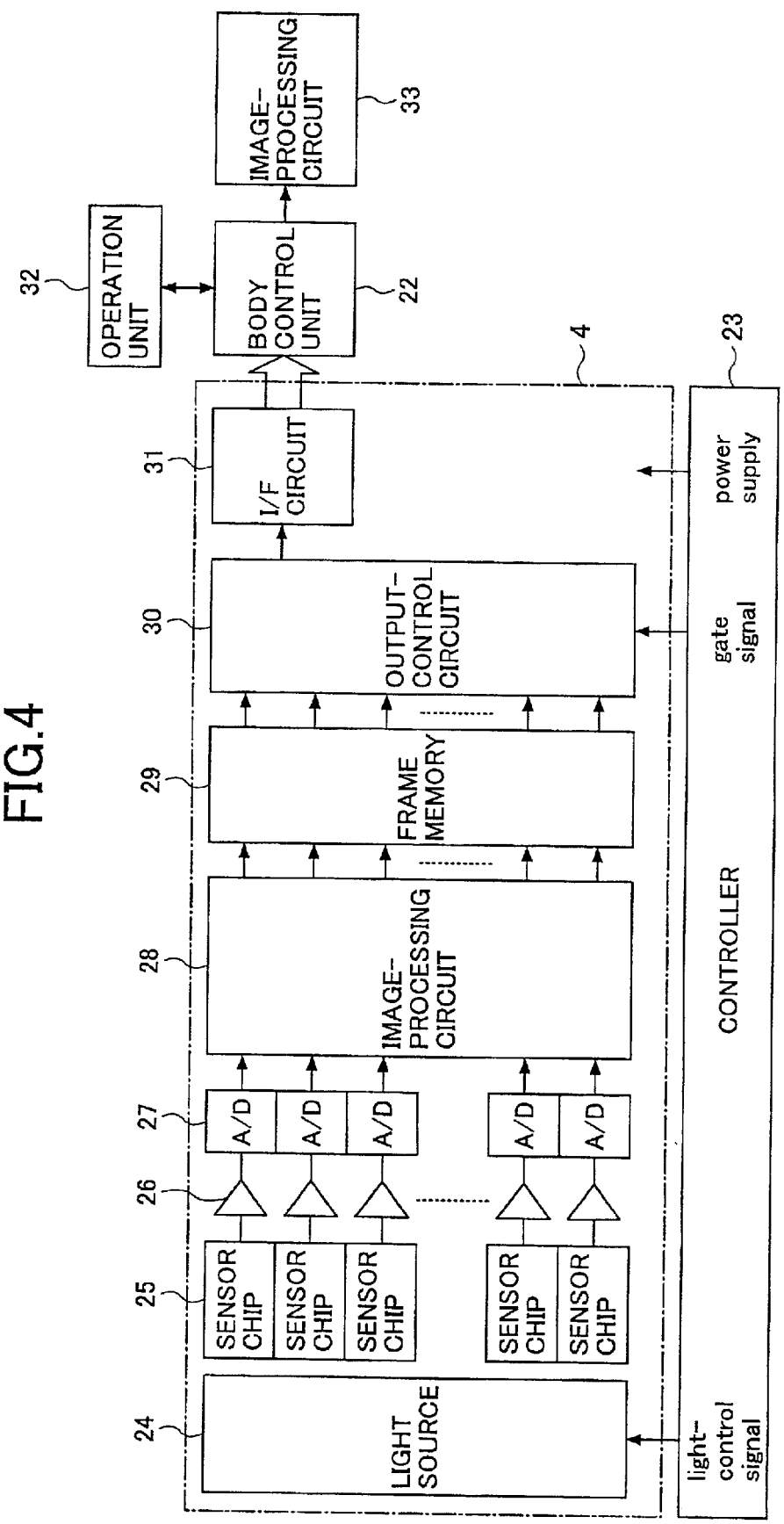
FIG. 4 is a block diagram showing an electrical connection of a control system of the copier according to the first embodiment of the present embodiment.

The second image-reading unit 4 can read the image (a back-side image) of the subject copy D conveyed on the subject-copy-conveying path 7 by using a CCD 25 which is a photoelectric converting element (see FIG. 4). The second read roller 12 is placed opposite the second image-reading unit 4 with the subject-copy-conveying path 7 therebetween. When the second image-reading unit 4 reads the subject copy D, the second read roller 12 is revolved at the same speed as the conveying rollers 8 by a stepping motor (not shown in the figure), and functions in such a manner as to keep the distance constant between the image-containing surface of the subject copy D and the second image-reading unit 4.

As shown in FIG. 1, the printer 2 comprises a photosensitive member 14, a laser unit 15, a developing unit 16, a transferring unit 17, a fixing unit 18, and other elements. The surface of the photosensitive member 14 is uniformly electrified by an electrifying unit (not shown in the figure). The image read by the first image-reading unit 3 or the second image-reading unit 4 is written on the surface of the photosensitive member 14 by the laser unit 15 so as to form an electrostatic latent image. This electrostatic latent image is made visible as a toner image by a toner supplied from the developing unit 16. This visible toner image is transferred to a sheet 20 fed from a sheet-feeding cassette 19, by the transferring unit 17. The sheet 20 to which the toner image is transferred undergoes a fixing process in the fixing unit 18, and thereafter the sheet 20 is delivered to a delivery tray 21.

Figure 2:
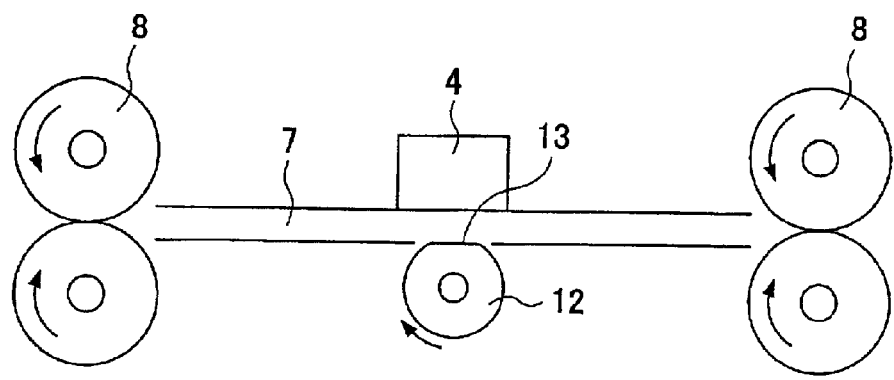
FIG. 2 is a vertical-sectional front view showing a second read roller and a part of a subject-copy-conveying path in the proximity thereof, shown in FIG. 1.
Figure 3:
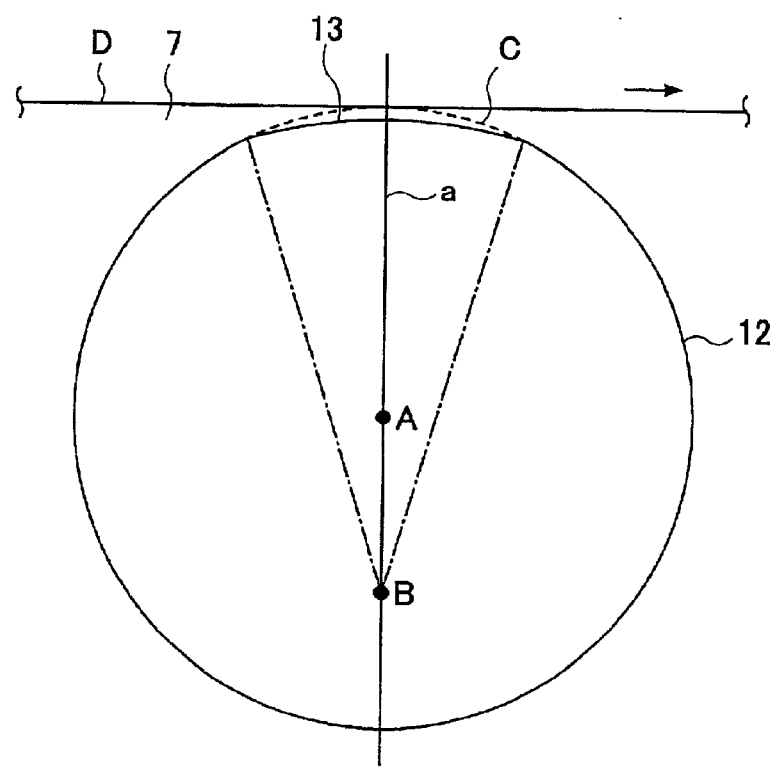
FIG. 3 is a magnified vertical-sectional front view of the second read roller.

FIG. 2 is a vertical-sectional (front) view showing the second read roller 12 and a part of the subject-copy-conveying path 7 in the proximity thereof. FIG. 3 is a magnified front view of the second read roller 12. As shown in FIG. 2 and FIG. 3, the second read roller 12 is formed of such material as rubber or resin into a white color so that a cross-sectional shape thereof becomes substantially round, and is placed opposite the CCD 25 of the second image-reading unit 4. A reference-white read surface 13 is formed at a part of the outer periphery of the second read roller 12, the reference-white read surface 13 receding toward a central axis A of the second read roller 12. The reference-white read surface 13 has a center of curvature B on a straight line "a" crossing the central axis A orthogonally so that the reference-white read surface 13 is formed as a convex and curved surface located inside an outermost peripheral locus C of the second read roller 12. (The outermost peripheral locus C is a substantially completely round outer peripheral surface of the second read roller 12, assuming that the reference-white read surface 13 were not provided, as indicated by a broken line and the rest of a solid line in FIG. 3.)

FIG. 4 is a block diagram showing an electrical connection of a control system of the copier according to the present embodiment. As shown in FIG. 4, a body control unit 22 comprises a CPU so as to control the copier as a whole. A controller 23 comprises a CPU, and is connected with actuators and sensors of the image scanner 1, such as motors driving the conveying rollers 8. The controller 23 controls these actuators and sensors. An operation unit 32 comprises various keys and a LCD display to conduct various operations of this copier.

In the second image-reading unit 4, a light source 24 projects a light to the subject copy D according to a light-control signal supplied from the controller 23. Thereby, the image of the subject copy D is converged on the CCD 25 via a lens (not shown in the figure). Thus, according to a gate signal XSFGATE (to be described hereinbelow) supplied from the controller 23, the CCD 25 reads the image of the subject copy D when the subject copy D is conveyed to the second image-reading unit 4. The image data read by the CCD 25 is temporarily stored in a frame memory 29 via an AMP circuit 26, an A/D converting circuit 27, and an image-processing circuit 28. Thereafter, the image data is transferred to the body control unit 22 via an output-control circuit 30 and an I/F circuit 31. Consequently, the image data of the backside of the subject copy D is transferred to an image-processing circuit 33.

In the copier having the above-described structure, when selecting a double-side copy mode, the subject copy D, which is set on the subject-copy-setting unit 5 with the front-side facing upward, is conveyed one by one via the subject-copy-conveying path 7 so that the image of the front side is read by the first image-reading unit 3, and the image of the backside is read by the second image-reading unit 4. Then, the images read by the first image-reading unit 3 and the second image-reading unit 4 are copied on the front side and the backside of the same sheet 20, realizing a double-side copy.

In this copier, the image-processing circuit 33 performs an image-processing including a black-shading correction, a white-shading correction, and a γ correction, with respect to the image data of the subject copy D. In the second image-reading unit 4, white-shading data used in the white-shading correction is created by reading the surface of the second read roller 12 placed opposite the CCD 25. Hereinafter, a description will be given of the creation of the white-shading data.

Figure 5:
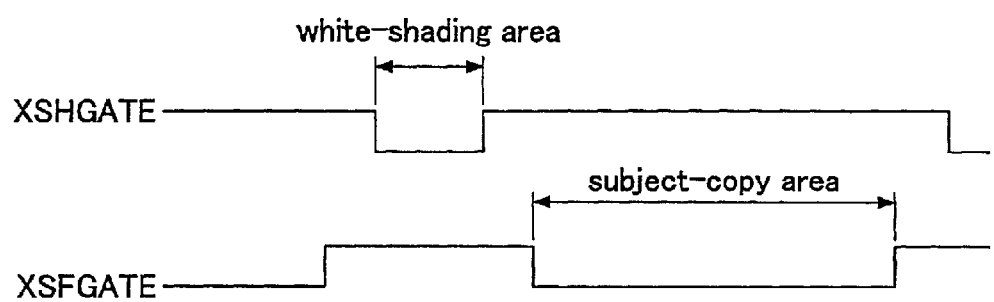
FIG. 5 is a timing chart used for explaining a creation of white-shading data in the copier according to the first embodiment of the present embodiment.

As shown in a timing chart of FIG. 5, in a period in which the gate signal XSFGATE indicating a reading period of the subject copy D is not active (not in a subject-copy area), i.e., while the subject copy D is not conveyed over the second image-reading unit 4, a gate signal XSHGATE indicating a creating period of the white-shading data (an assert period) becomes active (in a white-shading area) corresponding to a constant circumferential range of the second read roller 12, for example, a range corresponding to one round of the second read roller 12, so as to obtain the white-shading data.

Figure 6:
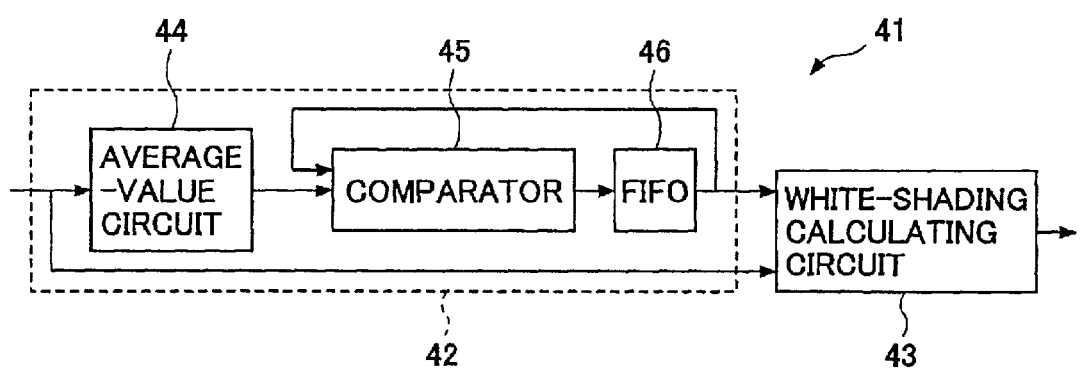
FIG. 6 is a block diagram illustrating a circuit structure of a white-shading correcting circuit of the copier according to the first embodiment of the present embodiment.

FIG. 6 is a block diagram showing an example of a circuit structure of a white-shading correcting circuit 41 performing the white-shading correction in the image-processing circuit 33. As shown in FIG. 6, this white-shading correcting circuit 41 comprises a white-shading data creating circuit 42 and a white-shading calculating circuit 43. The white-shading data creating circuit 42 comprises an average-value circuit 44, a comparator 45 and a FIFO (first-in, first-out) circuit 46, and creates the white-shading data. The comparator 45 and the FIFO circuit 46 form a peak-value circuit.

Thus, the gate signal XSHGATE is supplied from the controller 23 so that the second image-reading unit 4 reads a predetermined constant range of the second read roller 12 by using the CCD 25. This realizes a reading means and a reading step.

Figure 7:
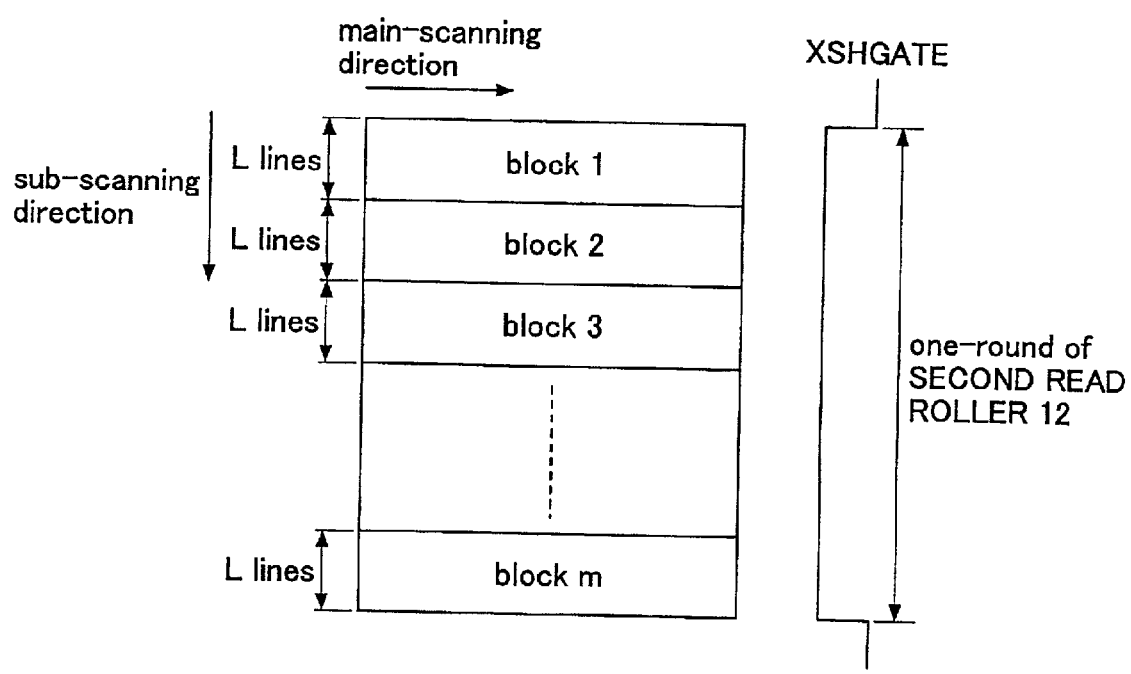
FIG. 7 is an illustration used for explaining the creation of the white-shading data.

The read image data is supplied to the average-value circuit 44. As shown in FIG. 7, the average-value circuit 44 divides the image data into m blocks, each block including L lines, so as to obtain a simple average of image data in the L lines of each of the m blocks. Specifically, the average-value circuit 44 obtains an average value of image data in the L lines of each of the m blocks with respect to each pixel. This realizes an averaging means (the average-value circuit 44) and an averaging step.

Figure 8:
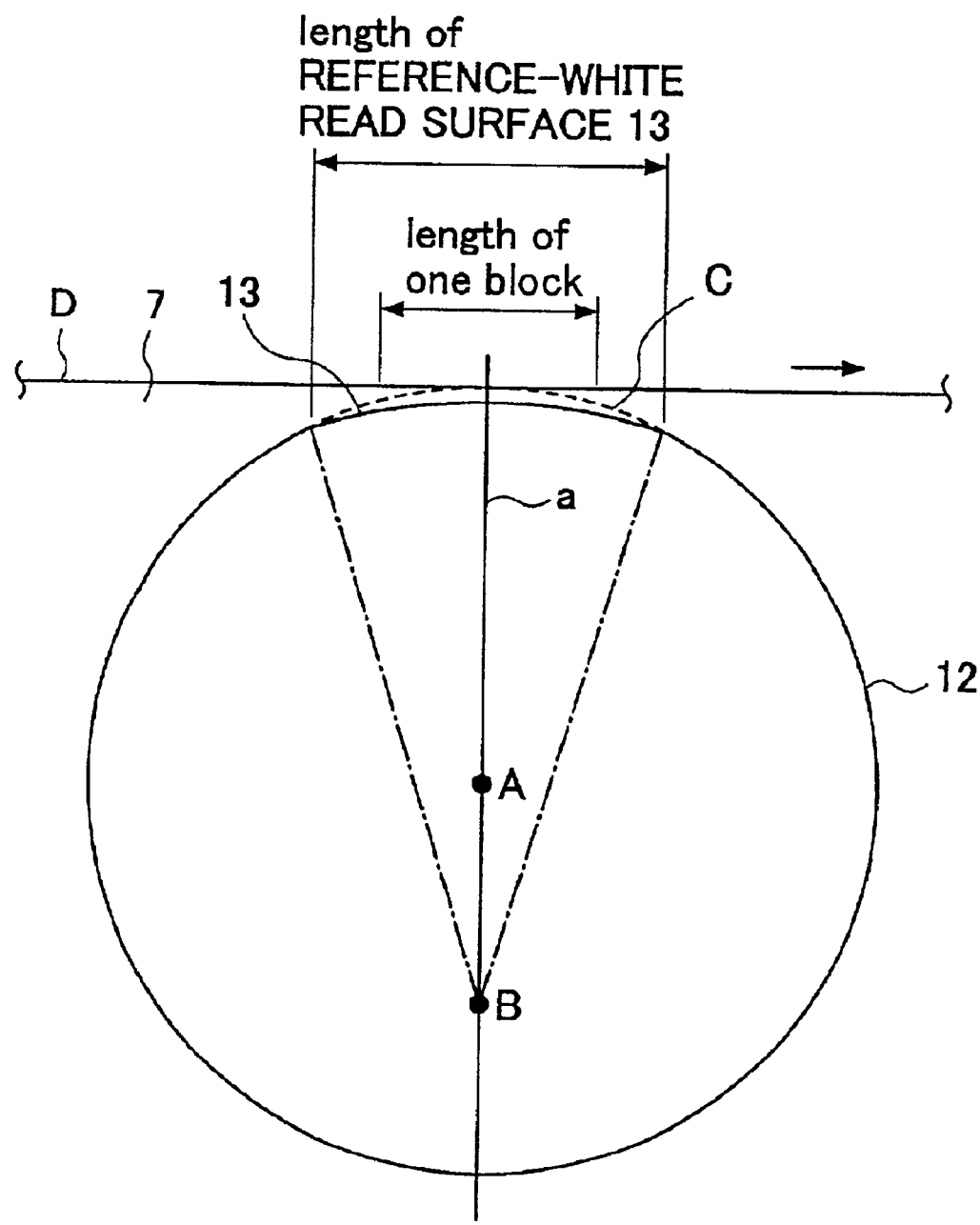
FIG. 8 is another magnified vertical-sectional front view of the second read roller.

In this case, the length of each block (i.e., the number L of lines) is preferred to be smaller than the length of the reference-white read surface 13 (i.e., the number of lines read by the reference-white read surface 13). (See FIG. 8.)

Additionally, the above-mentioned constant range (i.e., a read range) of the second read roller 12 does not have to be limited to one round thereof, but may be predetermined as a range exceeding one round, for example, two rounds or three rounds, and the length of each block may be so set that, when the read range exceeding one round is divided into the blocks, a fractional block is created in each round thereof.

Figure 9:
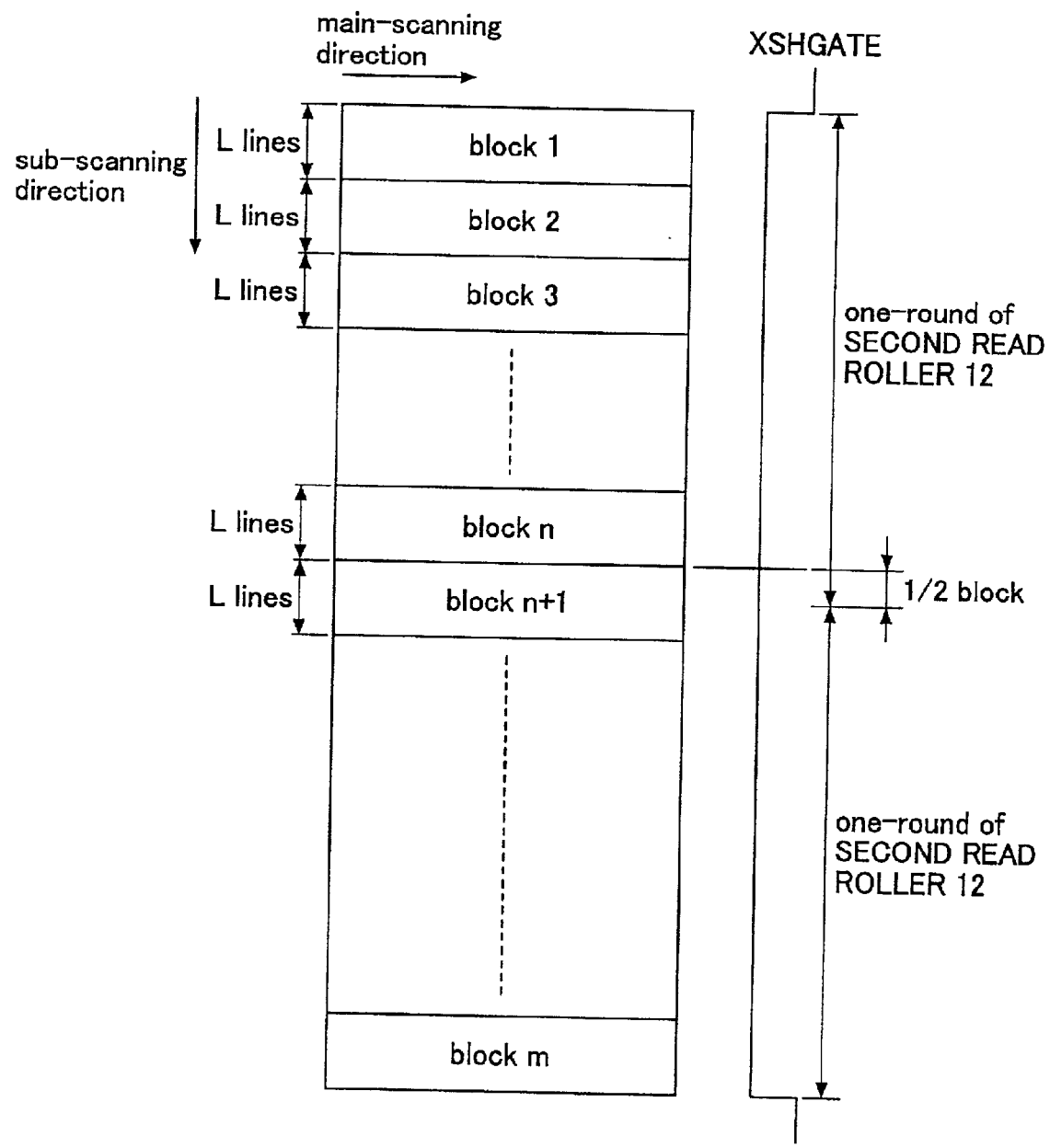
FIG. 9 is an illustration used for explaining the creation of the white-shading data.

FIG. 9 is an illustration of one of those examples. In this example, two rounds of the second read roller 12 are read. The length of each of m blocks is so set that each of the two rounds is divided into n blocks and a ½ (fractional) block (2n+1=m blocks for the entire two rounds). Consequently, positions of the blocks in the second round are shifted by a ½ block from the blocks in the first round.

Subsequently, a peak value of the average values of the m blocks is obtained by the comparator 45 and the FIFO circuit 46. Specifically, the average values of the m blocks are supplied one by one from the average-value circuit 44 to the comparator 45. Then, the comparator 45 compares a preceding average value and a following average value so as to supply the larger average value to the FIFO circuit 46. The FIFO circuit 46 stores the larger average value, and then supplies the larger average value back to the comparator 45 as the preceding average value. This process is repeated for all of the average values so that the FIFO circuit 46 stores the peak value. The peak value is supplied to the white-shading calculating circuit 43 as the white-shading data. The white-shading calculating circuit 43 performs the white-shading correction to the image data of the subject copy D by using this white-shading data. Calculating a peak value as described above (by the comparator 45 and the FIFO circuit 46) realizes a peak-value determining means and a peak-value determining step. Performing a white-shading correction as described above (by the white-shading calculating circuit 43) realizes a white-shading correcting means.

Upon obtaining the average Value, the average value of image data in all of the lines of each of the blocks may be obtained, as described above. However, it is preferable to obtain an average value of image data in lines at intervals of one or several lines, for example, every second line, or every third line, in each of the blocks. Specifically, this can be achieved by the CPU of the body control unit 22 controlling image data of each of the blocks to be supplied to the average-value circuit 44 at intervals of one or several lines.

A further specific description will be given of the heretofore-described process.

An average value in each block is obtained by a calculation of an expression (1).

$$Dm(n)=INT[\Sigma D(n)/L] \quad (1)$$

Dm(n): calculation data of an n-th pixel of an m-th block; lines in the m-th block ranging from m*L to (m+1)*L−1

D(n): read data of the n-th pixel

ΣD(n) a sum of D(n) from 1st to L-th lines

L: the number of lines in one block

INT [ ]: rounding to the nearest whole number

A peak value of the average values is obtained as white-shading data by calculations of expressions (2) to (4).

$$\text{When } Dp(n)<Dm(n), Dp(n)=Dm(n) \quad (2)$$

$$\text{When } Dp(n)>=Dm(n), Dp(n)=Dp(n) \quad (3)$$

Dp(n): white-shading data of the n-th pixel (a peak value)

Provided that, in the first block, $$Dp(n)=Dm(n) \quad (4)$$

A white-shading correction is performed by a calculation of an expression (5).

$$Dsh=(D(n)/Dp(n))\times 255 \quad (5)$$

When white-shading data is created by the above-described processes, the white-shading data can be obtained by selecting image data of an unstained part of a constant read range on the surface of the second read roller 12. Therefore, a density of the white-shading data can be kept uniform so as to perform a high-quality image-reading.

Additionally, since the second read roller 12 has the above-described shape, the reference-white read surface 13 is not likely to contact the subject copy D being conveyed. Accordingly, the reference-white read surface 13 is not likely to be stained due to the contact with the subject copy D; thus, the reference-white read surface 13 can be kept white for a long period of time without cleaning. Therefore, a density of the white-shading data can be kept uniform precisely so as to perform a higher-quality image-reading.

The read range of the second read roller 12 may be limited within a range corresponding to the reference-white read surface 13 which is expected to be the least stained. However, in the present invention, the read range of the second read roller 12 is set as at least one round thereof. Thereupon, the white-shading data can be created from the least stained part on the surface of the second read roller 12. Therefore, a density of the white-shading data can be kept uniform precisely so as to perform a high-quality image-reading.

In this case, when the length of each block is made smaller than the length of the reference-white read surface 13, at least one block can exclusively include the image of the reference-white read surface 13. Therefore, a density of the white-shading data can be kept uniform precisely so as to perform a high-quality image-reading.

In addition, the read range of the second read roller 12 may be set as a range exceeding one round thereof, for example, two rounds pr three rounds, and the length of each block may be so set that, when the read range exceeding one round is divided into the blocks, a fractional block is created in each round thereof. This enables calculating average values of a plurality of blocks positioned differently in a particular part on the surface of the second read roller 12 at each round. Therefore, a density of the white-shading data can be kept uniform precisely so as to perform a high-quality image-reading.

Further, upon obtaining an average value as described above, the average value of image data may be calculated with respect to lines at intervals of one or several lines, for example, every second line, or every third line, in each of the blocks. In this case, even when a small flaw or a small stain exists on the surface of the second read roller 12, the influence thereof can be decreased. Therefore, a density of the white-shading data can be kept uniform precisely so as to perform a high-quality image-reading.

[Embodiment 2]

A description will now be given of a second embodiment according to the present invention.

The following description will be given mainly of different points of the second embodiment from the first embodiment, in which elements of the second embodiment that are identical or equivalent to the elements described in the first embodiment are referenced by the same reference marks, and will not be described in detail.

The second embodiment differs from the first embodiment in that, not the white-shading correcting circuit 41, but the CPU of the body control unit 22 performs the creation of the white-shading data and the calculation of the white-shading correction.

Figure 10:
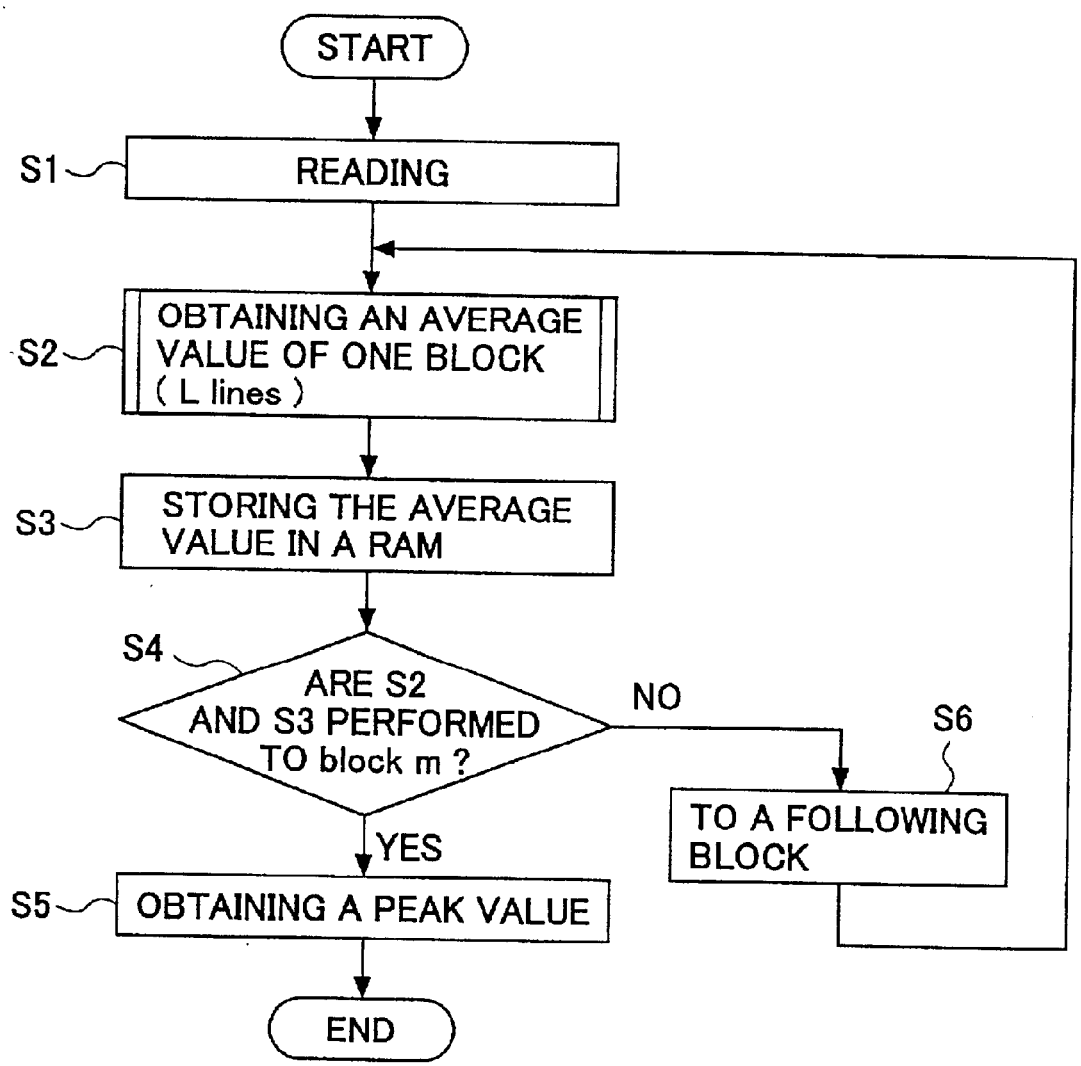
FIG. 10 is a flowchart illustrating a creation of white-shading data in a copier according to a second embodiment of the present embodiment.

The following description will be given, with reference to a flowchart shown in FIG. 10, of a process of creating white-shading data performed by the CPU of the body control unit 22. First, the gate signal XSHGATE is supplied from the controller 23 so as to read a predetermined constant range of the second read roller 12 (step S1). This realizes the reading means and the reading step.

Then, an average value of a first block 1, i.e., first L lines, of image data read from the second read roller 12 is obtained (step S2). Subsequently, the average value is stored in a predetermined area of a RAM (not shown in the figure) (step S3). When the step S2 and the step S3 are not performed to a last block m yet (N in step S4), the step S2 and the step S3 are repeated to a following block (step S6) until the step S2 and the step S3 are performed to the last block m (Y in the step S4). The step S2 realizes an averaging means and an averaging step.

In the step S2, it is preferred, as in the first embodiment, that the read range of the second read roller is at least one round thereof, that in this case the length of each block is arranged smaller than the length of the reference-white read surface 13, and that the read range of the second read roller 12 is set as a range exceeding one round, for example, two rounds or three rounds, and the length of each block is so set that, when the read range exceeding one round is divided into the blocks, a fractional block is created in each round thereof.

After the step S2 and the step S3 are performed to the last block m (Y in the step S4), a peak value is obtained as white-shading data from among all of the average values of the blocks 1 to m (step S5). Thereafter, a white-shading correction is performed to image data of the subject copy D by using this white-shading data. The above-described calculations of the expressions (1) to (5) represent the heretofore-described process with respect to FIG. 10 more specifically. The step S5 realizes a peak-value determining means and a peak-value determining step.

In the step S2, it is also preferred, as in the first embodiment, that the average value of image data is calculated with respect to lines at intervals of one or several lines, for example, every second line, or every third line, in each of the blocks 1 to m.

Figure 11:
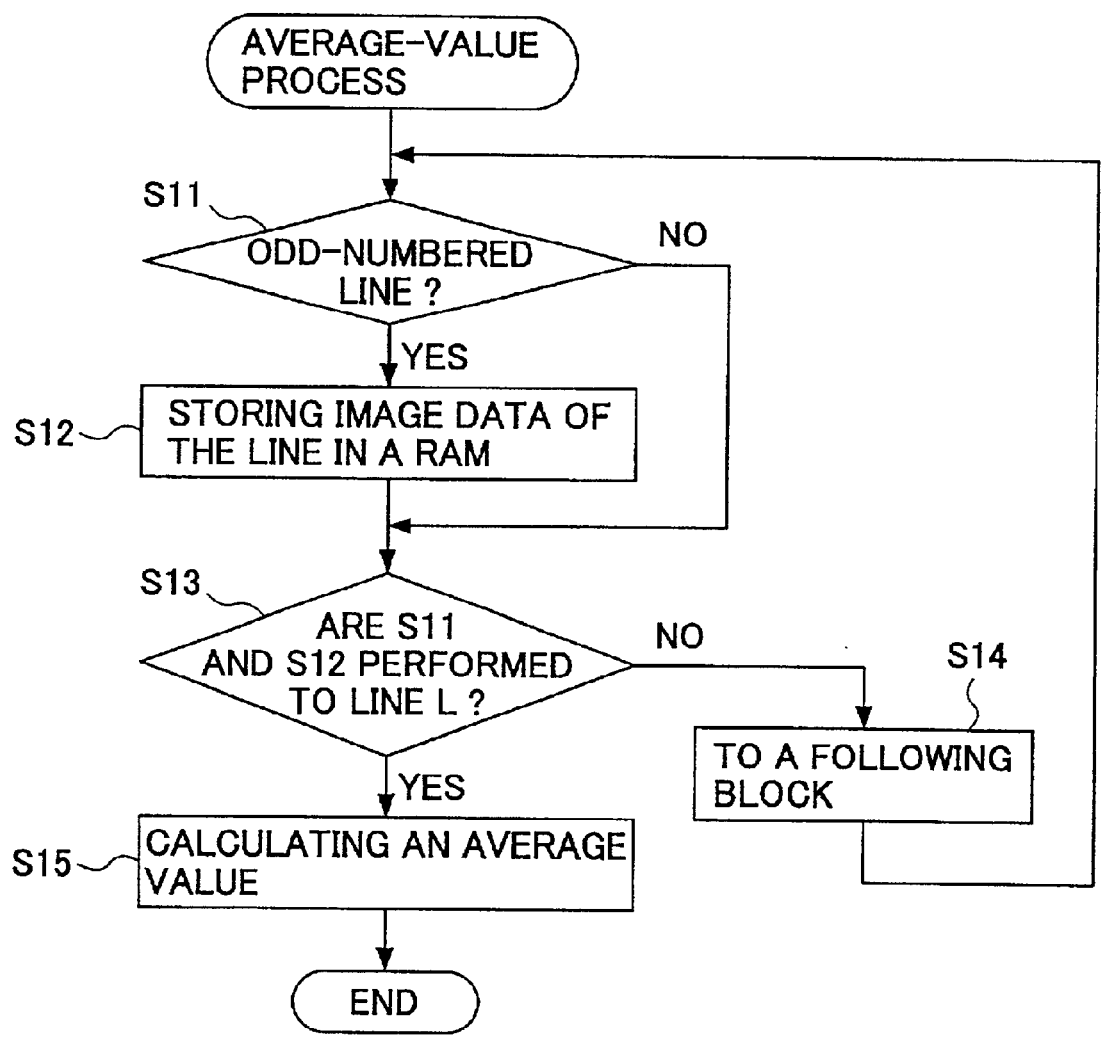
FIG. 11 is a flowchart illustrating a process of obtaining an average value in the creation of the white-shading data.

Specifically, the following process is performed so as to obtain an average value of image data, for example, of every second line in each of the blocks 1 to m. That is, the step S2 of FIG. 10 is performed as shown in FIG. 11. First, it is judged whether or not the present line is an odd-numbered line, one by one from a first line in each block (step S11). When the present line is an odd-numbered line (Y in the step S11), image data of the present line is stored in a predetermined area of a RAM in the body control unit 22 (step S12). When the step S11 and the step S12 are not performed to a last (L-th) line in the present block yet (N in step S13), the step S11 and the step S12 are repeated to a following line (step S14) until the step S11 and the step S12 are performed to the last line in the present block (Y in the step S13). After the step S11 and the step S12 are performed to the last line in the present block (Y in the step S13), an average value of the image data of the odd-numbered lines stored in the RAM is calculated (step S15).

[Embodiment 3]

A description will now be given of a third embodiment according to the present invention.

The following description will be given mainly of different points of the third embodiment from the first and second embodiments, in which elements of the third embodiment that are identical or equivalent to the elements described in the first and second embodiments are referenced by the same reference marks, and will not be described in detail.

Figure 12:
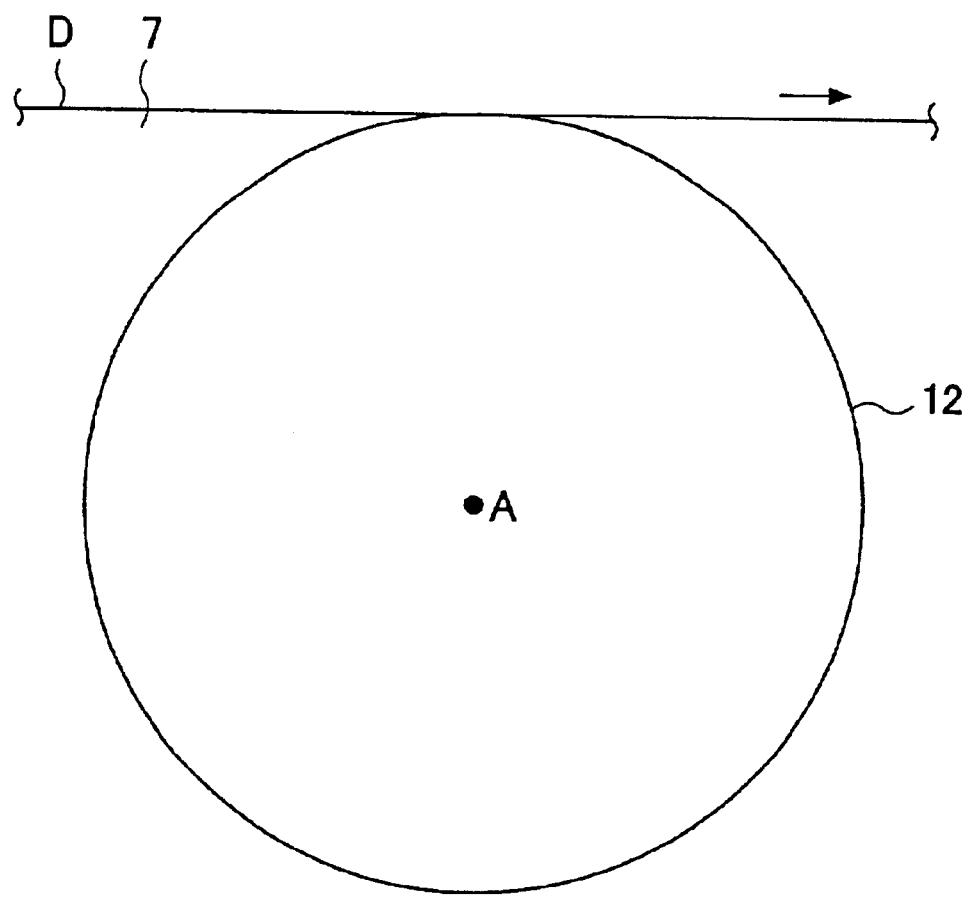
FIG. 12 is a magnified vertical-sectional front view of a second read roller of a copier according to a third embodiment of the present embodiment.

The third embodiment differs from the first and second embodiments in that the second read roller 12 does not have the shape as described with reference to FIG. 3, but has such a shape that a cross-section thereof perpendicular to the central axis A is a substantially complete round, as shown in FIG. 12, and that the reference-white read surface 13 is not formed.

It is noted that the creation of the white-shading data may be performed either by the white-shading data creating circuit 42 as in the first embodiment or by the CPU of the body control unit 22 as in the second embodiment.

In the present third embodiment, it is preferred, as in the first and second embodiments, that the read range of the second read roller is at least one round thereof, and that the read range of the second read roller 12 is set as a range exceeding one round, for example, two rounds or three rounds, and the length of each block is so set that, when the read range exceeding one round is divided into the blocks, a fractional block is created in each round thereof.

In the present third embodiment, it is also preferred, as in the first and second embodiments, that the average value of image data is calculated with respect to lines at intervals of one or several lines, for example, every second line, or every third line, in each of the blocks 1 to m.

[Embodiment 4]

A description will now be given of a fourth embodiment according to the present invention.

The following description will be given mainly of different points of the fourth embodiment from the first to third embodiments, in which elements of the fourth embodiment that are identical or equivalent to the elements described in the first to third embodiments are referenced by the same reference marks, and will not be described in detail.

Figure 13:
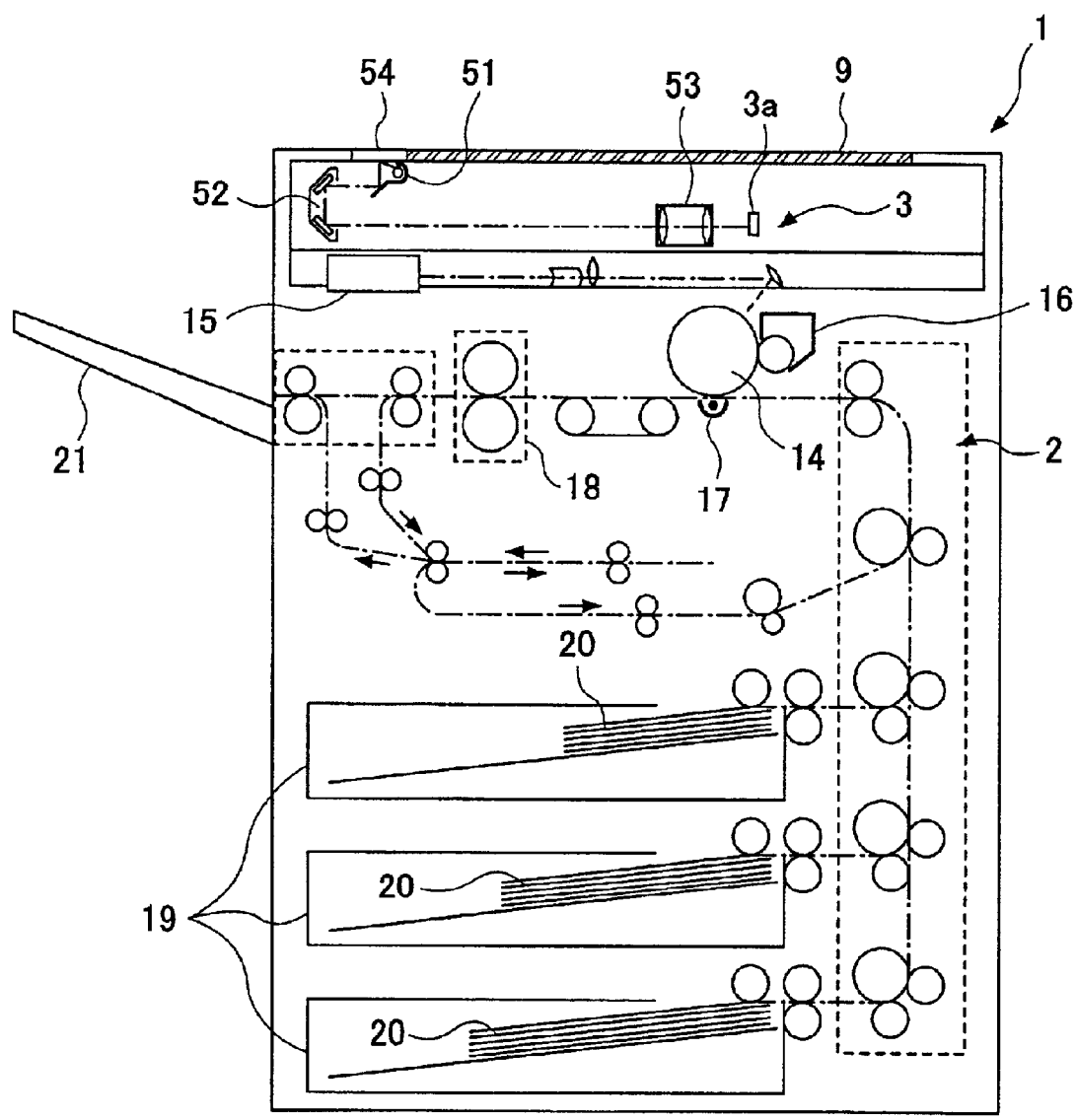
FIG. 13 is a vertical-sectional front view outlining a structure of a copier according to a fourth embodiment of the present invention.

The fourth embodiment differs from the first to third embodiments in that the image scanner 1 does not comprise the second image-reading unit 4, the subject-copy-setting unit 5, the subject-copy-delivering unit 6, the subject-copy-conveying path 7, the conveying rollers 8, the second contact glass 10, the first read roller 11, and the second read roller 12, as shown in FIG. 13, in which only the first image-reading unit 3 with the first contact glass 9 reads the image of the subject copy D.

Specifically, a first carriage 51, a second carriage 52 and a lens unit 53 form a scanning optical system. The first carriage 51 comprises a light source used for exposing the subject copy D and a first reflective mirror. The second carriage 52 comprises a second reflective mirror and a third reflective mirror. The lens unit 53 is used for forming an image on the CCD 3a which is a photoelectric converting element.

A reference-white plate (a reference-white member) 54 is provided as a reference white used for creating the white-shading data. The first image-reading unit 3 reads a predetermined constant range of the reference-white plate 54 by using the CCD 3a. This realizes a reading means and a reading step. The creation of the white-shading data may be performed either by the white-shading data creating circuit 42 as in the first embodiment or by the CPU of the body control unit 22 as in the second embodiment. In this case, a read range of the reference-white plate 54 is preferred to be as large as possible. Regarding the obtainment of the peak value performed by the comparator 45 and the FIFO circuit 46, or by the step S5, it is preferred, as in the first to third embodiments, that the average value of image data is calculated with respect to lines at intervals of one or several lines, for example, every second line, or every third line, in each of the blocks 1 to m.

In the heretofore-described first to fourth embodiments, the second read roller 12 or the reference-white plate 54 is read as a reference white, and then the read image data is divided into the m blocks, each block including the L lines. This process may be replaced with the following process.

Figure 14:
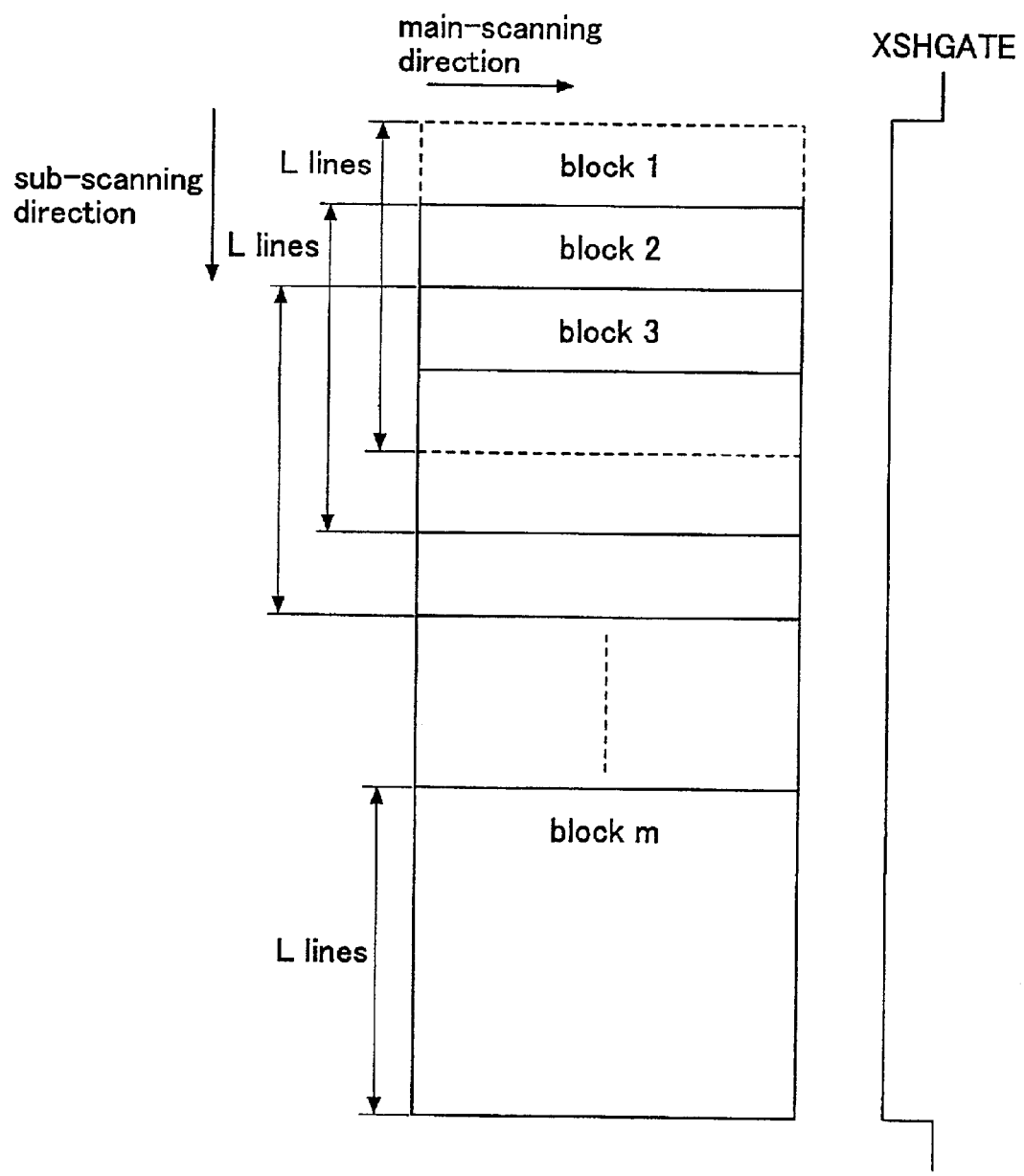
FIG. 14 is an illustration used for explaining another example of the creation of the white-shading data.

As shown in FIG. 14, in the assert period of the gate signal XSHGATE (see FIG. 5), average values are calculated respectively for blocks 1 to m by a moving average method, in which each of the blocks 1 to m includes L lines, and the starting line of each block is shifted from the starting line of a preceding block by one line. In each block, a simple average value of image data in the L lines is obtained (by a calculation based on the foregoing expression (1)), and then a peak value is obtained as white-shading data from among the simple average values obtained for the m blocks with respect to each pixel (by calculations based on the foregoing expressions (2) to (4)).

It is noted that the above-mentioned moving average values may be calculated by shifting the start of each block by a plurality of lines. However, it is preferred that the moving average values are calculated by shifting the start of each block by one line, as described above, because this improves the precision of selecting image data of an unstained part of the second read roller 12 or the reference-white plate 54 as the white-shading data.

The present invention is not limited to the specifically disclosed embodiments, and variations and modifications may be made without departing from the scope of the present invention.

The present application is based on Japanese priority applications No. 2000-266106 filed on Sep. 1, 2000 and No.

2001-075636 filed on Mar. 16, 2001, the entire contents of which are hereby incorporated by reference.

What is claimed is:

1. An image-reading device comprising:
   a subject-copy-conveying path conveying a subject copy;
   a photoelectric converting element placed on said subject-copy-conveying path so as to read a first image from a surface of said subject copy;
   a read roller placed opposite said photoelectric converting element with said subject-copy-conveying path therebetween so as to keep a distance constant between said surface of said subject copy and said photoelectric converting element by revolving, a surface of the read roller functioning as a reference white used in a white-shading correction;
   reading means for reading a second image from a constant range on said surface of said read roller by using said photoelectric converting element;
   averaging means for dividing image data of said second image into a plurality of blocks in a sub-scanning direction so that each of the blocks includes a plurality of lines, and obtaining average values of image data of said lines in said blocks respectively;
   peak-value determining means for obtaining a peak value of said average values; and
   white-shading correcting means for performing the white-shading correction to image data of said first image by using said peak value as white-shading data, wherein said constant range is a range exceeding one round on said surface of said read roller; and
   a length of each of said blocks in the sub-scanning direction is so set that, when said constant range is divided into said blocks, a fractional block is created in each round of said constant range.

2. The image-reading device as claimed in claim 1, wherein said read roller has a reference-white read surface formed as a part of said surface thereof, the reference-white read surface having a center of curvature on a straight line crossing a central axis of said read roller orthogonally so that said reference-white read surface is formed as a curved surface located inside an outermost peripheral locus of said read roller.

3. The image-reading device as claimed in claim 2, wherein said constant range is at least one round on said surface of said read roller, and a length of each of said blocks in the sub-scanning direction is smaller than a length of said reference-white read surface.

4. An image-reading device comprising:
   a subject-copy-conveying path conveying a subject copy;
   a photoelectric converting element placed on said subject-copy-conveying path so as to read a first image from a surface of said subject copy;
   a read roller placed opposite said photoelectric converting element with said subject-copy-conveying path therebetween so as to keep a distance constant between said surface of said subject copy and said photoelectric converting element by revolving, a surface of the read roller functioning as a reference white used in a white-shading correction;
   an image-reading unit reading a second image from a constant range on said surface of said read roller by using said photoelectric converting element;
   an average-value circuit dividing image data of said second image into a plurality of blocks in a sub-scanning direction so that each of the blocks includes a plurality of lines, and obtaining average values of image data of said lines in said blocks respectively;
   a peak-value circuit obtaining a peak value of said average values; and
   a white-shading calculating circuit performing the white-shading correction to image data of said first image by using said peak value as white-shading data, wherein said constant range is a range exceeding one round on said surface of said read roller; and
   a length of each of said blocks in the sub-scanning direction is so set that, when said constant range is divided into said blocks, a fractional block is created in each round of said constant range.

5. The image-reading device as claimed in claim 4, wherein said read roller has a reference-white read surface formed as a part of said surface thereof, the reference-white read surface having a center of curvature on a straight line crossing a central axis of said read roller orthogonally so that said reference-white read surface is formed as a curved surface located inside an outermost peripheral locus of said read roller.

6. The image-reading device as claimed in claim 5, wherein said constant range is at least one round on said surface of said read roller, and a length of each of said blocks in the sub-scanning direction is smaller than a length of said reference-white read surface.

7. A method of creating reference-white data, comprising:
   the reading step of reading an image from a constant range on a surface of a reference-white member by using a photoelectric converting element, the reference-white member functioning as a reference white used in a white-shading correction;
   the averaging step of dividing image data of said image into a plurality of blocks in a sub-scanning direction so that each of the blocks includes a plurality of lines, and obtaining average values of image data of said lines in said blocks respectively; and
   the peak-value determining step of obtaining a peak value of said average values so as to create white-shading data,
   wherein said reading step reads an image from a constant range on a surface of a revolving read roller as said reference-white member, the revolving read roller being placed opposite said photoelectric converting element, and the constant range being a range exceeding one round on said surface of said revolving read roller; and
   said averaging step sets a length of each of said blocks in the sub-scanning direction so that, when said constant range is divided into said blocks, a fractional block is created in each round of said constant range.

8. The method as claimed in claim 7, wherein said reading step reads an image from a constant range on a surface of a revolving read roller as said reference-white member, the revolving read roller being placed opposite said photoelectric converting element, and said constant range is at least one round on said surface of said revolving read roller.

9. The method as claimed in claim 7, wherein said reading step reads an image from a constant range on a surface of a revolving read roller as said reference-white member, the revolving read roller being placed opposite said photoelectric converting element and having a reference-white read surface formed as a part of said surface thereof, the reference-white read surface having a center of curvature on a straight line crossing a central axis of said revolving read roller orthogonally so that said reference-white read surface is formed as a curved surface located inside an outermost peripheral locus of said revolving read roller, and the constant range being at least one round on said surface of said revolving read roller; and said averaging step sets a length of each of said blocks in the sub-scanning direction smaller than a length of said reference-white read surface.

10. The method as claimed in claim 7, wherein said averaging step obtains average values of image data of at least every second line of said lines in said blocks respectively.

11. The method as claimed in claim 7, wherein said averaging step obtains moving averages of image data of respective sets of lines in said image, instead of obtaining the average values of the image data of said lines in said blocks respectively; and said peak-value determining step obtains a peak value of said moving average values.

12. The method as claimed in claim 11, wherein said averaging step obtains the moving averages by moving first lines of the respective sets from each other by one line.

* * * * *